(12) United States Patent
Khattak et al.

(10) Patent No.: US 11,802,083 B2
(45) Date of Patent: Oct. 31, 2023

(54) SELF-SENSING HIGH PERFORMANCE FIBER REINFORCED GEOPOLYMER COMPOSITES

(71) Applicant: University of Louisiana at Lafayette, Lafayette, LA (US)

(72) Inventors: Mohammad Jamal Khattak, Lafayette, LA (US); Ahmed Khattab, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 16/862,761

(22) Filed: Apr. 30, 2020

(65) Prior Publication Data
US 2020/0290928 A1    Sep. 17, 2020

Related U.S. Application Data

(62) Division of application No. 15/906,653, filed on Feb. 27, 2018, now abandoned.

(60) Provisional application No. 62/463,783, filed on Feb. 27, 2017.

(51) Int. Cl.
| | | |
|---|---|---|
| *C04B 14/38* | (2006.01) | |
| *C04B 28/00* | (2006.01) | |
| *C04B 16/06* | (2006.01) | |
| *C04B 22/06* | (2006.01) | |
| *C09K 5/14* | (2006.01) | |
| *C04B 40/00* | (2006.01) | |
| *C04B 103/10* | (2006.01) | |
| *C04B 103/32* | (2006.01) | |
| *C04B 111/94* | (2006.01) | |

(52) U.S. Cl.
CPC .......... *C04B 28/006* (2013.01); *C04B 14/386* (2013.01); *C04B 16/0641* (2013.01); *C04B 22/062* (2013.01); *C04B 40/0046* (2013.01); *C09K 5/14* (2013.01); *C04B 2103/10* (2013.01); *C04B 2103/32* (2013.01); *C04B 2111/94* (2013.01); *C04B 2201/32* (2013.01)

(58) Field of Classification Search
None
See application file for complete search history.

(56) References Cited

U.S. PATENT DOCUMENTS

| | | | | |
|---|---|---|---|---|
| 2011/0193031 A1* | 8/2011 | Kolditz | ..................... | C08J 3/226 252/511 |
| 2014/0264140 A1* | 9/2014 | Gong | ...................... | C04B 38/02 252/62 |

OTHER PUBLICATIONS

Prabu et al. Rice Husk Ash Based Geopolymer Concrete—A Review. Chem Sci Rev Letter, 3(10), 288-294 (Year: 2014).*

* cited by examiner

*Primary Examiner* — Tanisha Diggs
(74) *Attorney, Agent, or Firm* — Kean Miller LLP; Lauren J. Rucinski; Brian J. Servé

(57) ABSTRACT

The current invention is a novel addition to the field and comprises a self-sensing high performance fiber reinforced Geopolymer composite (HPFR-GPC) with self-sensing ability. In one or more embodiment, the self-sensing abilities are created by the addition of high performance fibers into a Geopolymer composites. The HPFR-GPC exhibits smart, high performance, energy efficient, and sustainability characteristics including: enhanced tensile ductility, toughness, and strain hardening (including crack width control); improved piezoresistive effects; utilization of industrial by-product; high resistance to acid attacks; and lightweight, low density. When compared to current available embedded or attachable sensors, the current invention offers lower cost, higher durability, and a larger sensing volume.

5 Claims, 11 Drawing Sheets

SELF-SENSING HIGH PERFORMANCE FIBER REINFORCED GEOPOLYMER COMPOSITES

CROSS REFERENCE TO RELATED APPLICATIONS

This application is a divisional ("DIV") of U.S. Non-Provisional patent application Ser. No. 15/906,653 filed Feb. 27, 2018 which claims the benefit of and priority to U.S. Patent Provisional Application No. 62/463,783, "Self-sensing High Performance Fiber Reinforced Geopolymer Composites" filed Feb. 27, 2017.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Self-sensing High Performance Fiber Reinforced Geopolymer Composites, which may be embodied in various forms. It is to be understood that in some instances, various aspects of the invention may be shown exaggerated or enlarged to facilitate an understanding of the invention. Therefore the drawings may not be to scale.

BACKGROUND

Geopolymer materials represent an innovative class of "green" technology. Geopolymer systems rely on industrial by-products to significantly reduce the carbon footprint. Portland cement manufacturing requires an immense carbon footprint and is responsible for 85% of energy and 90% of $CO_2$ emissions of the concrete life cycle. Geopolymer technology could reduce those $CO_2$ emissions without economic sacrifice, while converting a potentially hazardous industrial by-product to a value-added construction material. Geopolymer binders utilize aluminosilicate rich industrial by-products and natural materials including fly ash, rice hull ash, furnace slag, and clays, etc. Such materials are activated using alkaline solutions including sodium hydroxide/sodium silicate to create 3D polymerized molecular chains and network that ultimately develop hardened binder. The material achieves high strength within 24-48 hours of thermal curing resulting in an efficient and economical process and material.

Until recently, there are no extensive utilizations of Geopolymer materials in infrastructure systems. In the U.S., a Geopolymer-Portland cement blend has been used for limited purposes such as rapid pavement repairs and military applications, but has not been optimized for widespread use. Various researchers have developed fiber reinforced Geopolymers and have demonstrated that the fiber reinforcement improves the mechanical and durability characteristics of Geopolymer composites. For example, Geopolymer concrete modified with glass fiber significantly increases the compressive strength over a short period of curing. Similarly, blast furnace slag based Geopolymer concrete reinforced with steel fibers performs substantially better than the Portland cement concrete reinforced with same steel fibers.

Further research on the behavior of PVA reinforced fly ash based geopolymer composites demonstrates that samples showed a strain hardening behavior with a high tensile ductility. Finally, the deflection-hardening behavior of Geopolymer modified with PVA and steel fiber has been studied. A fiber reinforce Geopolymer matrix was developed that exhibits sufficient ductility and formation of multiple cracks under bending loads. Concrete mixtures have also been modified using carbon nanotube ("CNT"), carbon nanofiber ("CNF"), in combination with short carbon fibers to improve its mechanical properties. Such modifications have incorporated piezoresistive effects thereby, making it as a sensor for damage detection and structural health monitoring.

In summary, although some prior art has reviewed the effects of fiber reinforced Geopolymers, the application, use, and full understanding of its capabilities is still in infancy. A more robust network of nanofibers is needed to apply this technology in wide spread application. Formation of a good network of CNF in the mixture not only augments the piezoresistive characteristics but also improves the mechanical properties and fracture resistance. The current invention comprises a method for the development of self-sensing high performance fiber reinforced Geopolymer composites using carbon nanofiber ("CNF") and the resulting composition.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Geopolymer technology has the potential to substantially reduce $CO_2$ in the infrastructure field. Geopolymer technology converts potentially hazardous industrial by-product to a value-added construction material. The current invention is a novel addition to the field and comprises a self-sensing high performance fiber reinforced Geopolymer composite (HPFR-GPC) with self-sensing ability. In one or more embodiment, the self-sensing abilities are created by the addition of high performance fibers into a Geopolymer composites. The HPFR-GPC exhibits smart, high performance, energy efficient, and sustainability characteristics including: enhanced tensile ductility, toughness, and strain hardening (including crack width control); improved piezoresistive effects; utilization of industrial by-product; high resistance to acid attacks; and lightweight, low density. When compared to current available embedded or attachable sensors, the current invention offers lower cost, higher durability, and a larger sensing volume.

In one embodiment, the invention comprises a method for the development of self-sensing high performance fiber reinforced Geopolymer composites (HPFR-GPC) using carbon nanofiber ("CNF") and the resulting composition. One suitable application, although there are many, of the present invention is for engineered cement composites ("ECC").

HPFR-GPC comprises a Geopolymer binder, additives, and a conductive filler. In one or more embodiments, the conductive filler comprises microfibers. Any suitable microfiber may be used, such as Polyvinyl Alcohol ("PVA") fibers. PVA fibers facilitate high ductility, increase strength, demonstrate good crack control, and improve freeze and thaw durability. In the embodiments that employ PVA fibers, the mixture contains between 0.5 and 5% PVA fibers. Other suitable microfibers include polypropylene fibers.

Besides the use of micro-fibers, other fibers may be used to reinforce the composite. Thus, in one or more embodiments, the conductive filler comprises a nanofiber. In one or more embodiments, the nanofiber comprises carbon nanofibers ("CNF"). Due to the lower cost of production and superb mechanical properties, carbon nanofibers ("CNF") are suitable for reinforcement of HPFR-GPC, such as ECC. The high Young's modulus, tensile strength, and thermal conductivity of CNFs increase the stiffness, flexural strength, and Young's Modulus of ECC.

Like all fibers, CNFs must be dispersed well within the matrix to work efficiently. Unfortunately, CNFs are subjected to van der Waals forces that cause the CNFs to attract one another and form clumps of CNFs. Thus, the CNFs must be uniformly dispersed within the ECC. This method described herein ensures that the CNF is dispersed within the Geopolymer composite to provide the highest stiffness and flexural strength and to avoid clumping.

Infrastructure requires periodic inspections to ensure there are no developed flaws that could lead to catastrophic failures. Although some non-destructive methods are available, such as C-scan, x-ray, eddy current, and coin tapping, each is labor intensive, costly, and/or impractical. Thus, the current invention comprises a practical way to conduct nondestructive monitoring of structures by incorporating self-sensing materials.

Geopolymer composites, especially ECCs, are ideal for the use of self-sensing capabilities because of their electrically conductive nature. When CNFs are well dispersed throughout the matrix, the electrical resistivity of the material is lowered by the electrically conductive fiber. This increase in conductivity of the material allows for the change in resistivity of the material to be easily measured. Once the material is damaged there is an increase in void spaces. These void spaces form areas of insulating air that increase the resistance of the material. Therefore, an increase in the resistivity of a material with CNFs can be associated with damage to the material. In one or more embodiments, CNF is employed to provide self-sensing capabilities to the Geopolymer composite, such as an ECC, as a conductive filler. However, other piezoresitivie inducing materials may be used. In one or more embodiments, the percentage of CNF is between 0.05 and 0.8 percent.

In one or more embodiments, the Geopolymer composite is dosed with CNF and PVA. In other embodiments, the composite comprises CNF or PVA. In other embodiments, the conductive filler comprises microfibers and nanofibers. In yet other embodiments, the composite comprises other types of suitable fibers.

Additives may include any suitable material that enhance the desired characteristics of the material such as higher compaction, faster curing, higher strength, and good thermal insulation. In one or more embodiments, such additives include: rice husk ash and silica sand. In one or more embodiments, Class F Fly Ash from silica sand is used. In one or more embodiments, a chemical activator is also used such as Sodium Silicate and Sodium Hydroxide. A suitable embodiment employs an alkaline (sodium silicate plus sodium hydroxide) to fly ash ration of 0.4 to 0.6, a sand to fly ash ratio of 0 to 0.8, a sodium silicate to sodium hydroxide ration of 0 to 2, and a sodium hydroxide molarity of 8 to 12.

In order to create HPFR-GPC, the required quantity of fly ash (based on the weighted percentages) is placed in an aluminum container. Silica sand is also weighed and then placed on top of the fly ash. The silica sand is much denser than the fly ash and may cause homogenous mixing issues if placed on the bottom. The fly ash and silica sand is then dry mixed by any suitable means for one to two minutes. The mixing ensures that all clumps are dispersed and that the silica sand and fly ash are adequately mixed. The alkaline solution is prepared by mixing a sodium silicate solution with a sodium hydroxide solution based on the appropriate ratios and allowed to cool. Superplasticizer is then added to the alkaline solution and mixed for a short period of time. Any suitable superplasticizer as known in the art may be used. Next the required amount of conductive filler is combined with the superplasticizer and alkaline solution and mixed at a high shear rate for between 5 and 15 minutes with an optimum time of 10 minutes. The alkaline mixtures are then poured in the fly ash and silicia sand mixture and combined for 1 to 5 minutes to ensure a homogenized mixture. The PVA micro fibers and/or CNF are then slowly added and mixed into the resulting mixture in a medium to high shear rate, which avoids any fiber entanglement. The mixtures are then oven cured to temperatures between 40 and 60 degrees Celsius.

Example 1

Dogbone specimens were prepared and tested under direct tensile loading using Materials testing system ("MTS"). The specimens were constructed using combination of fly ash, silica sand, Polyvinyl Alcohol ("PVA") fibers, and carbon nanofibers ("CNF"). The dog bone samples had a length of 9 inches and an average thickness of 0.5 inches. The widest portion of the sample was located at the far ends and measured 4 inches, while the middle measures 2 inches wide. All samples were oven cured at 60 degrees Celsius for two days and tested once cooled on the same day of demolding. Dog bone samples were then placed in a custom-made grip to evenly distribute forces and to avoid complications dealing with gripping the samples.

To determine the strain created under direct tension, dog bone specimens were analyzed using Digital Imaging Correlation technology ("DIC"). To measure the deformation of the sample at different stages of testing, DIC technologies compares images taken by a high precision camera and then determines the average displacement of the overall area of interest. To enhance the ability of the camera to capture these minor movements, the surface of the samples were speckled with black and white paint. To ensure accurate values, the center of the dog bone, referred as the middle third portion of the sample, was studied. All tensile samples were tested using a 22 kip materials testing system ("MTS") uniaxial loading frame under a displacement rate of 0.025 in/min with a real time data acquisition system. Under dynamic loading, a multitude of frequencies were used. Frequencies used during testing included 5 Hz, 1 Hz, 0.5 Hz and 0.1 Hz. For each frequency, a loading range was applied in a sinusoidal fashion. This loading ranged from 0 lbs. to 40% of the maximum tensile strength of the composite.

With regards to the strain sensing ability or piezoresistivity testing of the material, the four-probe method was used. To prepare the samples for testing, first both sides of the samples were sanded down. This was done to ensure a flat even surface existed and to ensure that the CNFs were exposed. Next, the four strips of conductive silver paint was carefully applied. The placement of the paint was held constant with all samples to ensure consistency. The two inner strips were painted exactly 3.54 in (9 cm) apart from one another and the two outer strips were located exactly 0.59 in (1.5 cm) from the inner strips. After the conductive paint was allowed to dry, a ⅛ in (0.32 cm) thick copper tape was applied over the paint. Next a conductive wire was soldered to each piece of conductive copper paint. These weirs were then used to connect electrodes to the sample. A constant current was then applied to the samples through the outer conductive wires and the initial voltage was read by the MTS machine from electrodes that were placed on the inner conductive wires.

The tensile load, strain, and voltage of the test sample were recorded using the MTS machine, an extensometer, and the VIC2D software used with DIC. The tensile stress (σ) was determine using the following equation:

$$\sigma = \frac{P}{A} \quad (1)$$

Where, P=applied tensile load (lb) and A=cross sectional area at the middle third of the specimen. The resistance (R) of the material was determined by dividing the voltage (V) by the current (I) as shown in equation 2.

$$R = \frac{V}{I} \quad (2)$$

Where, Resistivity (ρ) was calculated using equation 3.

$$\rho = R\frac{A}{\ell} \quad (3)$$

Where, $\ell$ is the distance between the inner probes. Finally, the self-sensing ability of the material can be found by the fractional change in the resistivity of the sample under loading (equation 4).

$$\frac{\rho - \rho_0}{\rho_0} \quad (4)$$

Where $\rho_0$ is the initial resistivity and $\rho$ is the resistivity at any load level.

Figure 1:
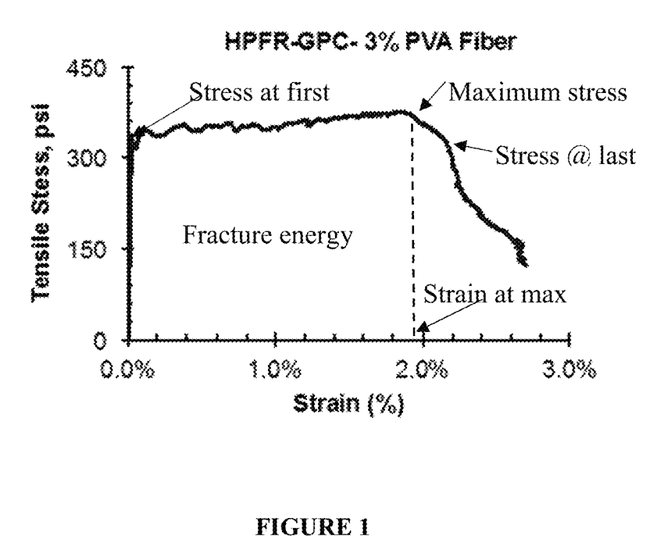
FIG. 1 is a graph that illustrates FIG. 3 Typical stress-strain behavior of HPFR-GPC.
Figure 2:
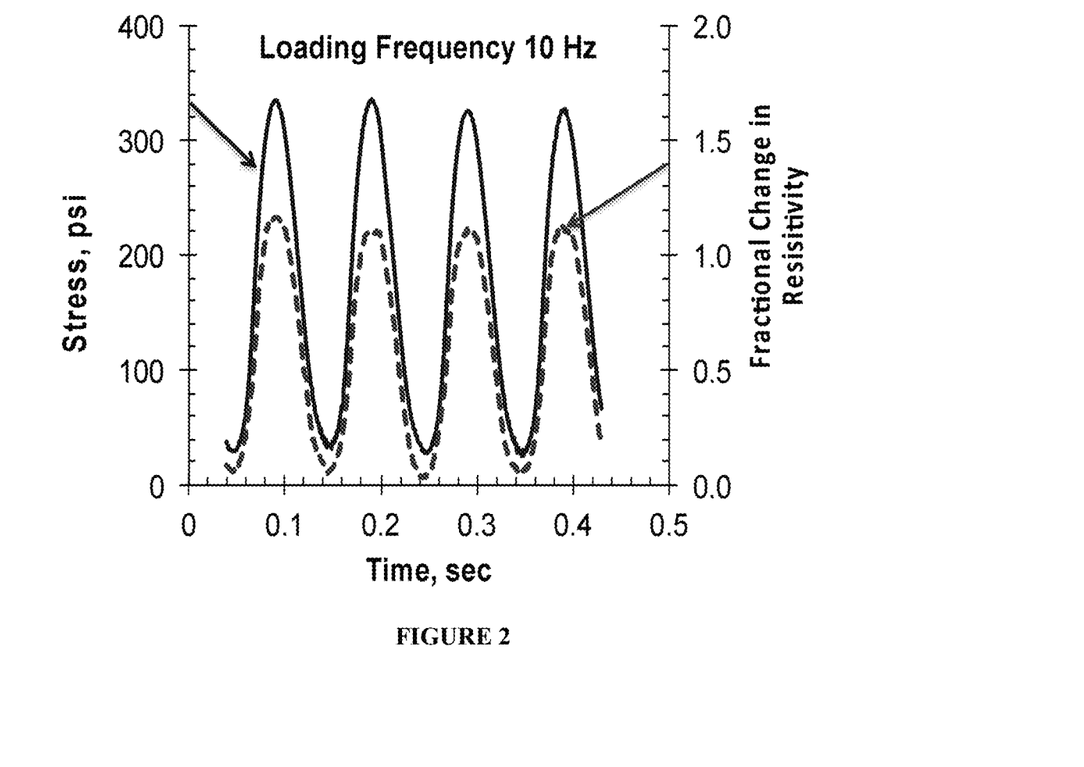
FIG. 2 is a graph that illustrates a typical self-sensing response (piezoresistive effect) of Geopolymer mixture modified with CNF under compressive dynamic loading at 10 Hz frequency.

A typical self-sensing response (piezoresistive effect) of Geopolymer mixture modified with CNF under compressive dynamic loading at 10 Hz frequency is shown in FIG. 2. It can be seen from the figure that the resistivity of the materials changes as the stress in the material varies. It is observed that as the stress increases the fractional change in resistivity also increases.

Figure 3:
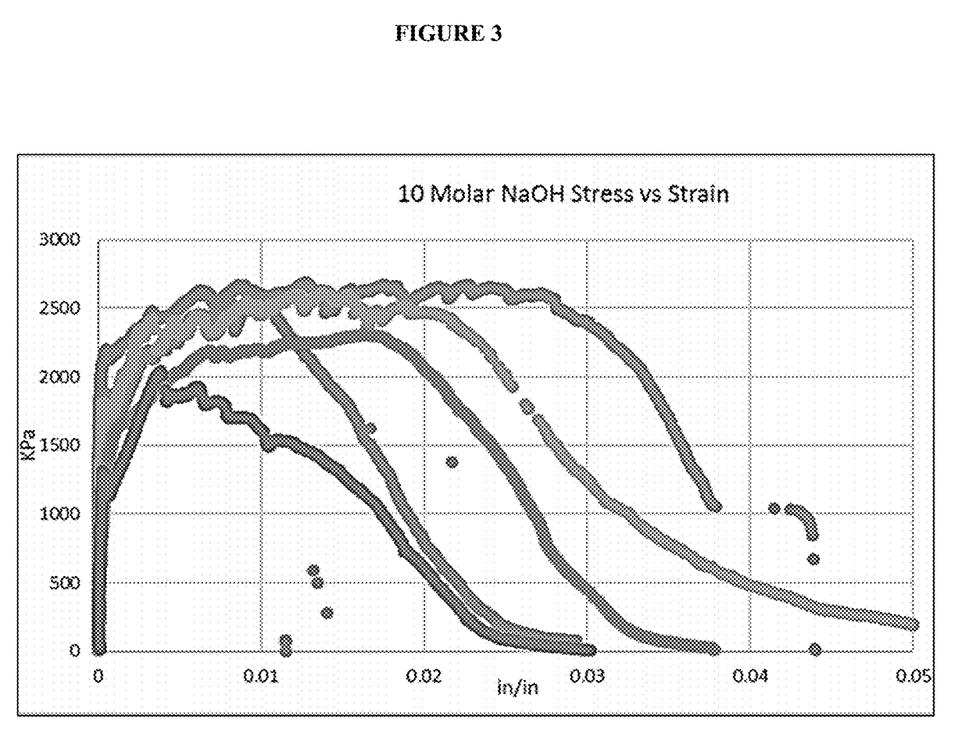
FIG. 3 is a graph that illustrates a typical stress-strain behavior of replicates samples of HPFR GPC mixtures.

FIG. 3 illustrates a typical stress-strain behavior of replicate samples of HPFR GPC mixtures. It is obvious that there is significant variations amongst the samples of a same mixture. The initial portions of loading are extremely important to the behavior of the composite. It is understood that the stress at first crack greatly effects the amplitude of future stress levels as sustained by the mixtures. Even though the strain at this stage does not much effect, it has an impact on the modulus determination. Another factor effecting the failure energy of the mixtures is the maximum stress indicating the ability of the mixtures to sustain this load. In order to develop HPFR GPC the mixture must have good ductility with a high strain capacity as well as fail in a non-catastrophic way. Because DIC technology was used to obtain the strain values during the experiment, it was possible to view the micro-cracks that were formed throughout the samples during testing. Higher crack numbers and a wider dispersion of the micro-cracks indicate higher strain values. For the failure type to be considered ductile, the stress that occur after the strain level at the last major crack must gradually decrease. This gradual decrease is directly related to the ability of the material to produce more micro-cracks after failure has occurred. In summary, the stresses and strains, at first crack, at maximum stress level, and at last crack were investigated. The fracture energy to failure as well as the elastic modulus of all the mixtures were also evaluated.

Several HPFR-GPC mixtures were constructed and tested using alkaline to fly ash ratio of 0.5, fiber content of 1.5%, NaOH/Na2SiO3 ratio of 1 with 10M NaOH solution and varying percentage of sand/fly ash ratios of 0, 0.4, and 0.8. The results of direct tensile test are shown in Table 1. It can be seen from the data that there is an optimum value for sand content (40%) related to highest first crack stress value. On the other hand, the addition of sand generally increases the maximum stress that samples can sustain. However, little difference was observed for the maximum stress values for the mixtures containing sand/fly ash ratio of 0.4 and 0.8.

TABLE 1

Summary of direct tensile test results for varying percentage of sand/fly ash ratio.

| | Sand/Fly ash Ratio | | | | | |
|---|---|---|---|---|---|---|
| | 0 | | 0.4 | | 0.8 | |
| | Average | Standard Deviation | Average | Standard Deviation | Average | Standard Deviation |
| Stress at first crack (KPa) | 811 | 150 | 1438 | 85 | 891 | 124 |
| Stress at last crack (KPa) | 1,209 | 144 | 1,467 | 251 | 1,778 | 197 |
| Strain first crack (%) | 0.043 | 0.008 | 0.014 | 0.003 | 0.018 | 0.003 |
| Strain last crack % | 1.8 | 0.8 | 0.8 | 0.3 | 0.3 | 0.2 |
| Elastic modulus (MPa) | 2,649 | 1,335 | 12,779 | 2,697 | 8,363 | 2,369 |
| Fracture energy (KPa-m/m) | 24 | 4.2 | 13 | 3.8 | 9 | 2.6 |

It is a common practice to add of fillers such as aggregate to concrete mixtures to decrease the cost of production. This practice does indeed decrease the cost of the product, but augment the properties of the concrete composite. Table 1 indicates the addition of sand greatly decreases the strain values obtained at the first crack and increases the elastic modulus of geopolymer composite. At sand to fly ash ratios of 0.4 (mix 1) and 0.8 (mix 9), the strain values do not greatly vary. The lower strain values may be due to the bond formed by the fly ash, sand and fibers. At lower sand contents, the sand maybe more capable of reacting with the alkaline and fly ash. The addition of sand may also hinder the reaction rate and cause the fibers to be ripped out instead of slipping out. Also, as stated before, the addition of sand may decrease the percentage of sand that is capable of reacting with the mixture, leaving small amounts of unreacted sand in the mixture and forming weak points in the specimen. Just like the strain at first crack response, the addition of sand seems to dramatically decrease the strain capacity of the mixture at the last crack. Even so, the strain values at the last crack are much greater than that of normal concrete, usually, 0.02-0.03%. Similarly, the fracture energy of the HPFR GPC mixtures with sand/fly ash of 0.4 was lower than the ones with no sand and higher than the ration of 0.8.

Example 3

Due to the brittle nature of geopolymers, fibers are added to improve the strain capacity of the composites. HPFR-GPC mixtures were prepared using alkaline to fly ash ratio of 0.5, NaOH/Na2SiO3 ratio of 1 and 10M NaOH solution, sand/fly ash ratio of 0.4 and varying percentage of fiber 0.75%, 1.5%, and 3%. The results of direct tensile test are shown in Table 2. The addition of fibers greatly increases the stress sustaining ability of the mixtures. Mixtures with 0.75% PVA fibers by volume exhibited brittle nature. A dramatic increase in the first and last crack stresses were observed for geopolymer mixtures with 1.5% and 3% fiber contents. This increase is stress can be attributed to the fibers ability to disperse the stresses by bridging across microcracks and causing hindrance to crack propagation.

It can be seen from the data in Table 2 that at higher fiber contents (3%) the strain at first and last cracks are much higher than that of the mixtures with lower fiber contents. Strain capacity of about 2% was obtained. This is an expected result, being that the addition of fibers allows for the elongation of the mixture by the production of multiple micro-cracks throughout the mixture. Higher stress levels in combination with higher strain capacity also resulted in higher fracture energy. DIC images conclude that the mixtures containing only 0.75% PVA fibers are extremely brittle. On the other hand, the mixtures containing 3% PVA fibers exhibited dispersed stresses throughout the sample. Mixtures containing a PVA fiber contents of 3% seem to break in a more reliable fashion and for the most part show the most ductile failure type.

TABLE 2

Summary of direct tensile test results for varying percentage of PVA fibers.

| | PVA Fiber dosage | | | | | |
|---|---|---|---|---|---|---|
| | 0.75% | | 1.5% | | 3% | |
| | Average | Standard Deviation | Average | Standard Deviation | Average | Standard Deviation |
| Stress at first crack (KPa) | 283 | 132 | 1,438 | 85 | 2,052 | 274 |
| Stress at last crack (KPa) | 279 | 104 | 1,467 | 251 | 2,267 | 276 |
| Strain first crack (%) | 0.02 | 0.01 | 0.02 | 0.004 | 0.08 | 0.014 |
| Strain last crack % | 0.33 | 0.19 | 0.80 | 0.23 | 2.0 | 0.48 |
| Elastic modulus (MPa) | 2,313 | 1,088 | 9,823 | 1,670 | 9,369 | 952 |
| Fracture energy (KPa-m/m) | 1.3 | 0.4 | 13 | 3.8 | 53 | 5.3 |

Example 4

Geopolymer composite mixtures were made using 2% PVA fiber content, NaOH/Na2SiO3 ratio of 1 and 10M NaOH solution, sand/fly ash ratio of 0.4, with varying alkaline ratios of 0.4, 0.5, and 0.6 and cured at 60 degrees Celsius. The results of direct tensile test are shown in Table 3. Unlike sand, the alkaline to fly ash ratio does not seem to affect the stress at first and last cracks very much. However the strain capacity improved. Interestingly, the fracture energy exhibited an optimum value at 0.5 ratio. The workability also seems to have positive effect at this ratio.

TABLE 3

Summary of direct tensile test results for varying alkaline/Fly ash ratio.

| | Alkaline/FA Ratio | | | | | |
|---|---|---|---|---|---|---|
| | 0.40 | | 0.50 | | 0.60 | |
| | Average | Standard Deviation | Average | Standard Deviation | Average | Standard Deviation |
| Stress at first crack (KPa) | 1243 | 150 | 1438 | 85 | 1555 | 140 |
| Stress at last crack (KPa) | 1628 | 249 | 1467 | 251 | 1524 | 142 |
| Strain first crack (%) | 0.01 | 0.0004 | 0.014 | 0.003 | 0.013 | 0.002 |
| Strain last crack %) | 0.2 | 0.03 | 0.8 | 0.22 | 1.0 | 0.090 |
| Elastic modulus (MPa) | 12039 | 2360 | 10252 | 1826 | 11418 | 458 |
| Fracture energy (KPa-m/m) | 11 | 0.6 | 13 | 3.8 | 8 | 2.0 |

Figure 4:
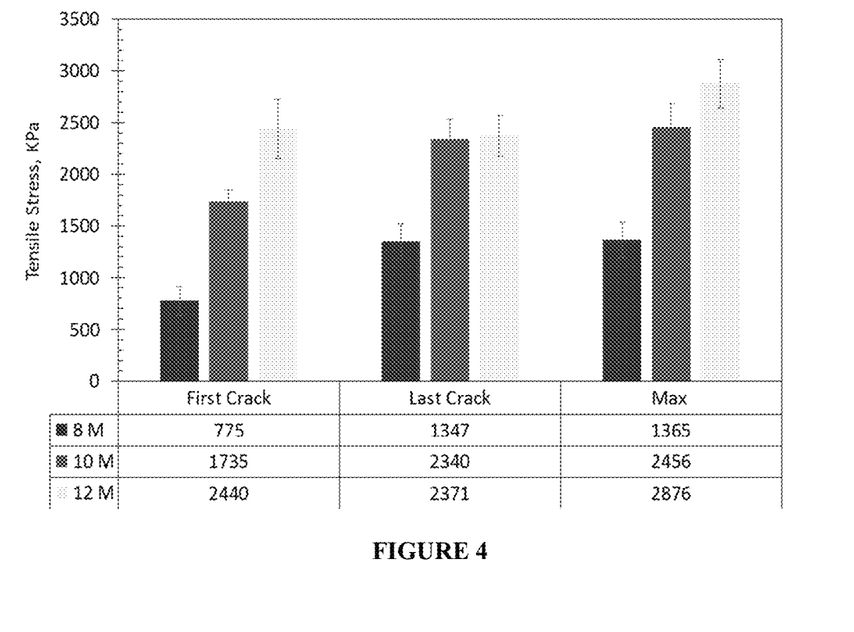
FIG. 4 is a graph that demonstrates stress at first, last cracks, and maximum stress as a function of NaOH molarity.

To explore the effect of changing NaOH Molar concentrations on the stress capabilities of the geopolymer composites, the stresses at first and crack last crack along with the maximum stresses were examined at NaOH molarities of 8 M, 10 M, and 12 M (FIG. 4). Such mixtures were cured at 60° C. and consisted of 2% PVA fiber content, NaOH/Na2SiO3 ratio of 1, sand/fly ash ratio of 0.4, and alkali/Fly ash ratio of 0.5. Generally, increasing molar concentrations seem to increase the stress capabilities. Only a slight increase occurs when the molar concentration increases from 10 M to 12 M.

Figure 5:
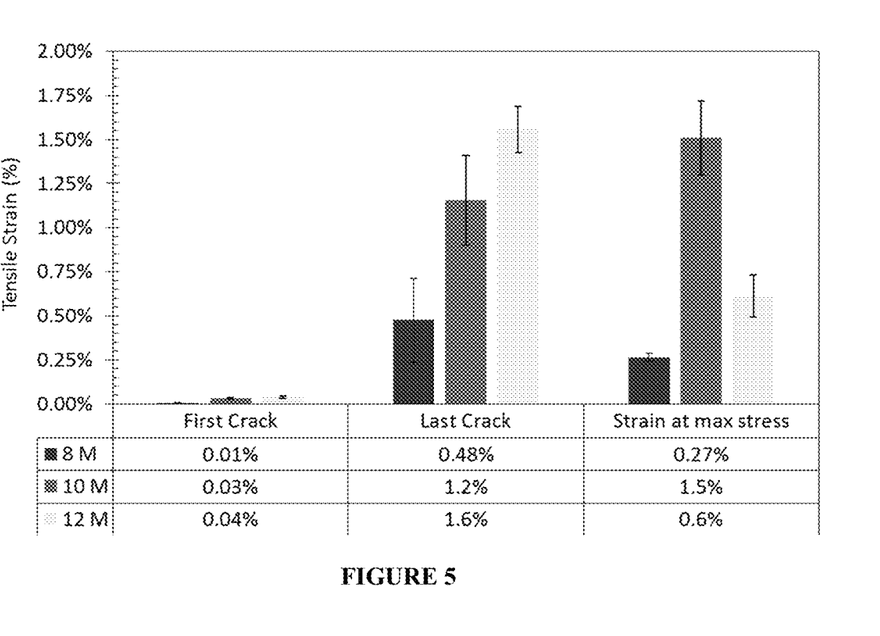
FIG. 5 is a graph that demonstrates strain at first and last cracks, and maximum stress as a function of NaOH molarity.

Similarly, increasing the NaOH molar concentration increases the strain capacity in the same manner as that of the stress capacity (FIG. 5). It can be seen from the following figure that a dramatic increase of 420% in the strain at first crack occurs when the NaOH concentration increases from 8 M to 10 M. Likewise, the strain at last crack and the strain at maximum stress dramatically increase by 140% and 300% respectfully.

Example 5

Figure 6:
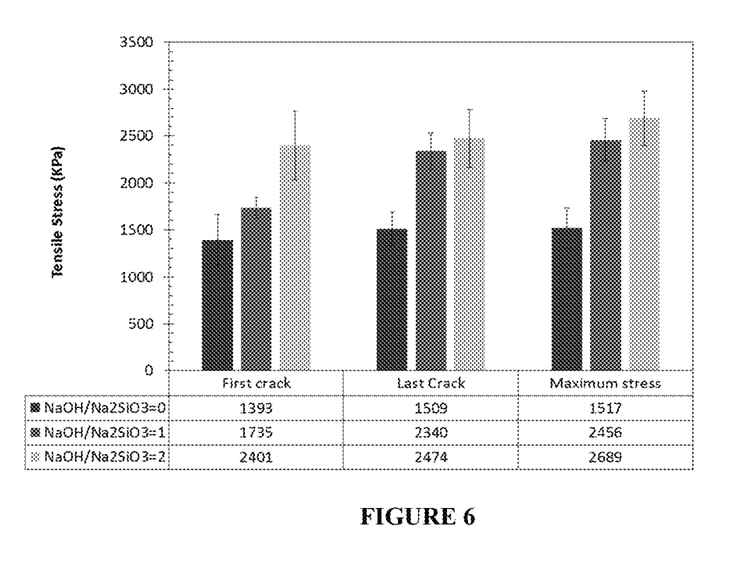
FIG. 6 is a graph that demonstrates stress at first and last cracks, and maximum stress as a function of alkali ratio.

Geopolymer composite mixtures were constructed using 2% PVA fiber content, 10M NaOH solution, sand/fly ash ratio of 0.4, alkaline/fly ash ratio of 0.5, and varying NaOH/Na2SiO3 ratio of 0, 1, and 2. All such mixtures were cured at 60° C. The effect of changing NaOH/Na2SiO3 ratios on the stress capabilities of the geopolymer materials are shown in FIG. 6. It should be noted that increasing the alkaline to alkaline ratio from 0 to 1 increases the last crack stress and maximum stress by 55% and 60% respectfully. As for the first crack stress, no true difference occurs between the two.

Figure 7:
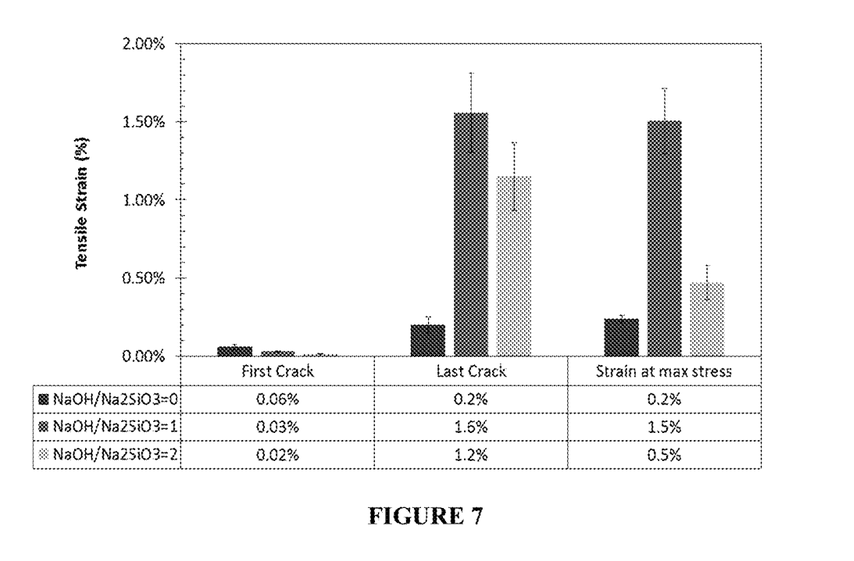
FIG. 7 is a graph that demonstrates strain at first crack, last crack, and strain maximum stress as a function of NaOH/Na2SiO3 ratio.

Regarding its effect on the strain capabilities, FIG. 7 shows that the average strain capacity of the material at first crack generally decreases as the ratio increases. However, it is seen that increasing the NaOH/Na2SiO3 ratio greatly increases the last crack strain of the material. This is contradictory of that of the average strain at first crack results. The ratio 1 exhibits the optimum stress-strain behavior.

Example 6

In order to evaluate the effect of curing temperatures various mixtures were prepared at curing temperatures of 40, 60 and 80° C. using 2% PVA fiber content, 10M NaOH solution, sand/fly ash ratio of 0.4, alkaline/fly ash ratio of 0.5, NaOH/Na2SiO3 ratio of 1. As expected, increasing the temperature from 40 to 80 degrees Celsius by increments of 20 degrees tends to generally increase the stress capability of the geopolymer composite. It can be shown from the data in Table 4 that increasing the temperature to 60 or 80 degrees Celsius does not greatly affect the first and last crack stresses of the material.

TABLE 4

Summary of direct tensile test results for the effect of curing temperatures.

| | Curing Temperature (° C.) | | | | | |
|---|---|---|---|---|---|---|
| | 40 | | 60 | | 80 | |
| | Average | Standard Deviation | Average | Standard Deviation | Average | Standard Deviation |
| Stress at first crack (KPa) | 1,555 | 213 | 1,735 | 112 | 1,995 | 197 |
| Stress at last crack (KPa) | 1,533 | 34 | 2,340 | 192 | 2,660 | 340 |
| Strain first crack (%) | 0.04 | 0.01 | 0.03 | 0.01 | 0.04 | 0.01 |
| Strain last crack %) | 1.3 | 0.28 | 1.4 | 0.25 | 1.0 | 0.3 |

TABLE 4-continued

Summary of direct tensile test results for the effect of curing temperatures.

| | Curing Temperature (° C.) | | | | | |
|---|---|---|---|---|---|---|
| | 40 | | 60 | | 80 | |
| | Average | Standard Deviation | Average | Standard Deviation | Average | Standard Deviation |
| Elastic modulus (MPa) | 2,251 | 645 | 4,890 | 1,084 | 5,269 | 801 |
| Fracture energy (KPa-m/m) | 27 | 2 | 49 | 6 | 27 | 3 |

On the other hand changing curing temperatures show no real effect on the strain at first crack. The strain at last crack and the strain at maximum stress does however seem to be effected by the changing of curing temperatures. It is noted that the largest strain values are obtained near curing temperatures of 60 degrees Celsius. Increasing the curing temperature from 40 to 60° C. increases the modulus nearly two folds. However only marginal improvements are observed hereafter. Considering the overall stress behavior as well as the fracture energy of the mixtures the curing temperature of 60° C. is adequate.

Example 7

Geopolymer composite mixtures were constructed using 2% PVA fiber content, 10M NaOH solution, sand/fly ash ratio of 0.4, alkaline/fly ash ratio of 0.5, NaOH/Na2SiO3 ratio 1, and varying CNF dosages of 0.1%, 0.25%, 0.5%, and 0.75%. In order to achieve better workability about 1-2% of superplasticizer was also added. The geopolymer mixtures were cured at 60° C. before testing. The addition of CNFs to the geopolymer material seems to increase the stresses at first crack and at last cracks. It can be seen from the data in the Table 5 that the addition of 0.10% CNF does not affect the strength capabilities of the geopolymer material. However, the addition of higher amounts of CNFs like 0.25%, 0.50%, and 0.75% greatly increases the overall stress capabilities of the material. The addition of CNFs will greatly increase the stress at first crack due to the increased ability of the material to bridge nano to micro cracks caused by curing and the initial stages of loading. Well dispersed CNFs could disperse the stresses throughout the samples so well that nano-cracks continuously form and postpone the formation of larger cracks. This results in low initial strain levels and hence increase in the elastic modulus of the material. However once the micro cracks are formed both CNF and PVA fiber work together in suppressing the formation and crack propagation thus improving the strain capacities as shown by up to 2.6% strain levels for 0.5 and 0.75% CNF dosages. Higher stress levels and strain capacities substantially increases the fracture resistance of the materials as observed by higher fracture energy values in Table 5. Samples with low CNFs produces specimens with no strength gaining capabilities, low stress and strain values and low energy values. DIC images also show that increasing CNF contents increases the number of cracks that are formed and proves that CNFs are capable of bridging cracks after the initial failure of the material.

TABLE 5

Summary of direct tensile test results for various CNF dosages

| | CNF Dosage (%) | | | | | | | |
|---|---|---|---|---|---|---|---|---|
| | 0.10% | | 0.25% | | 0.50% | | 0.75% | |
| | Average | Standard deviation | Average | Standard deviation | Average | Standard deviation | Average | Standard deviation |
| Stress at First Crack (KPa) | 1,373 | 225 | 2,231 | 355 | 1,568 | 262 | 2,361 | 576 |
| Stress at Last Crack (KPa) | 1,326 | 322 | 2,525 | 35 | 2,948 | 551 | 3,254 | 562 |
| Strain at First Crack (%) | 0.07 | 0.01 | 0.02 | 0.01 | 0.03 | 0.01 | 0.06 | 0.01 |
| Strain at Last Crack (%) | 1.0 | 0.5 | 1.6 | 0.1 | 2.6 | 0.6 | 2.5 | 0.1 |
| Elastic Modulus (MPa) | 3,101 | 669 | 4,860 | 1,217 | 4,462 | 885 | 3,899 | 507 |
| Fracture Energy (Kpa-mm/mm) | 10 | 1 | 64 | 20 | 66 | 16 | 72 | 9 |

Example 8

The self-sensing ability of the material was determined by the ability of the material to react to a cyclical loading under a spectrum of frequencies. To accomplish this, it is important to first determine if the material can produce a trend that mimics that of the loading.

Figure 8:
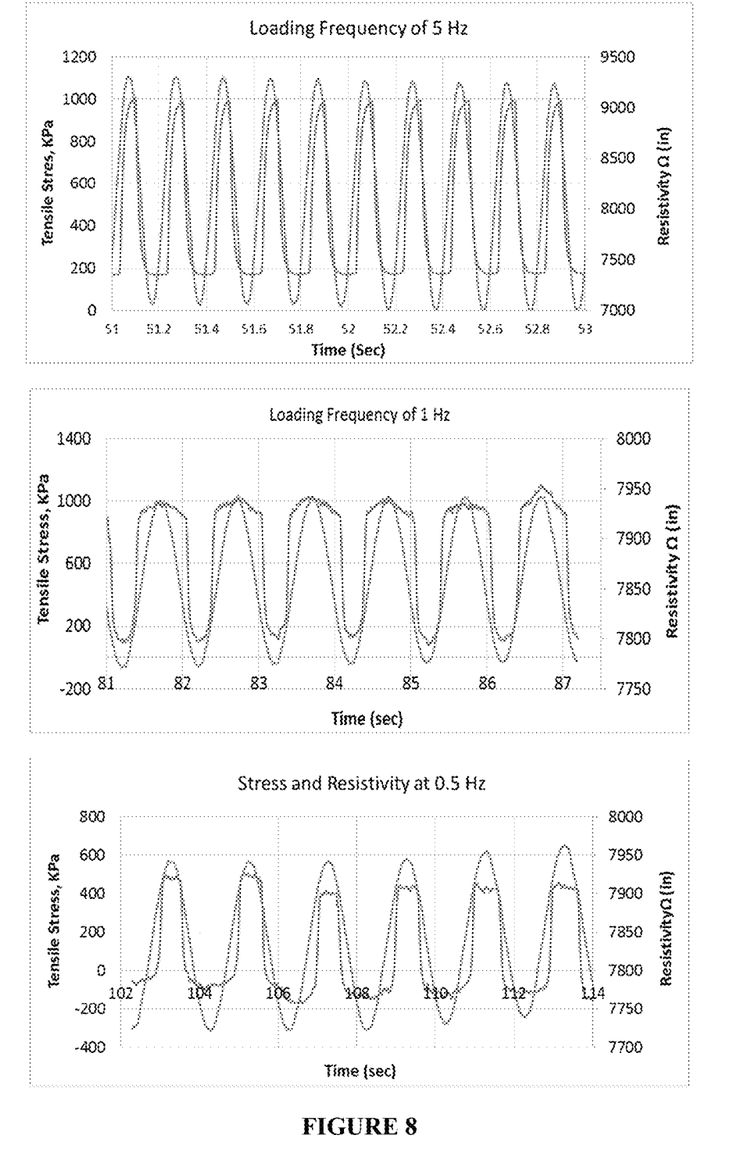
FIG. 8 is a series of graphs that show tensile stress and resistivity of HPFR-GPC at 0% CNF.

FIG. 8 illustrates the stress and corresponding resistivity response of the HPFR GPC with no CNF. At frequencies of 5 Hz, 1 Hz and 0.5 Hz the voltage response show a plateauing trend. When the tensile loading is maximized or minimized, it is seen that the voltage response is also maximized or minimized. The general trend of the resistivity does not exactly mimic that of the applied loading. This effect is clearer at a frequency of 0.5 Hz and voltage points between the maximum and minimum loadings are sparse. This indicates that the material is incapable of sensing the minor changings in loading and is only capable of capturing the maximum and minimum loading responses.

Figure 9:
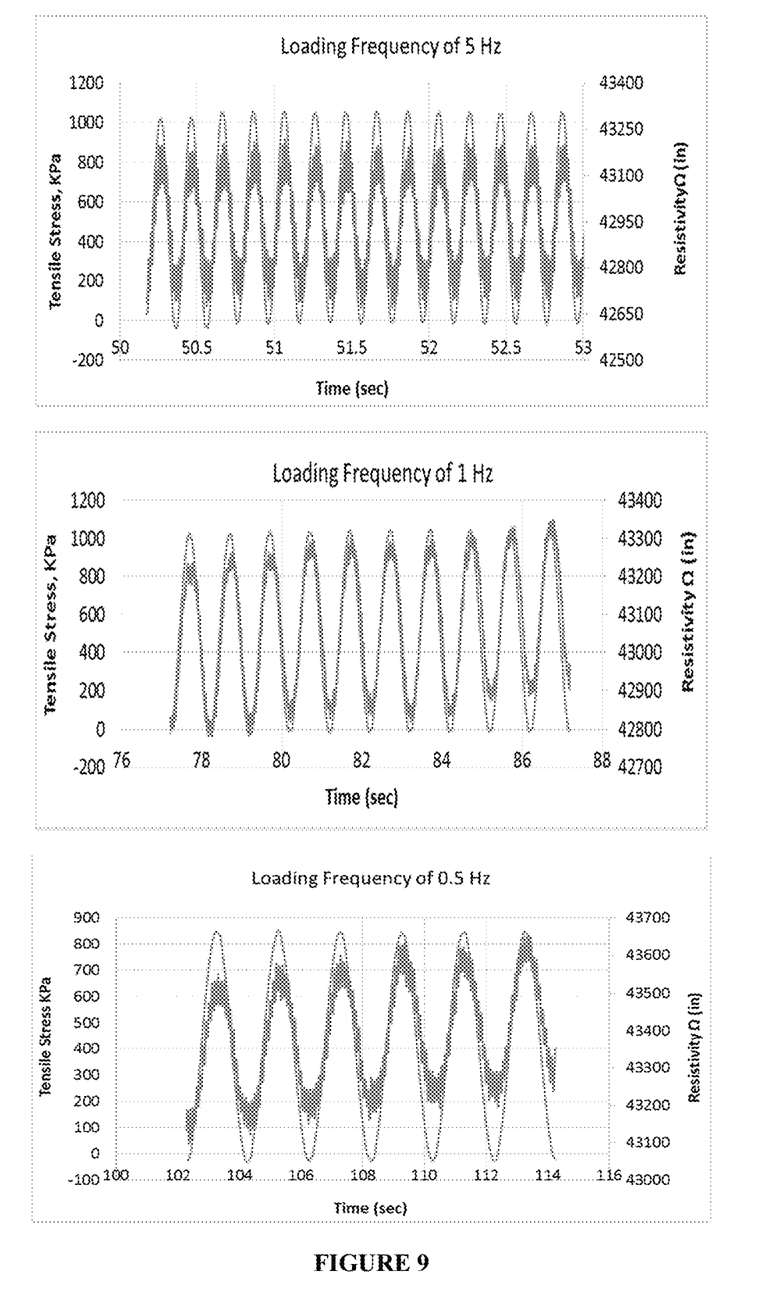
FIG. 9 is a series of graphs that shows tensile stress and resistivity of HPFR-GPC at 0.1% CNF.

The addition of 0.10% CNFs per weight of fly ash was also explored (FIG. 9). Unlike the piezoresistive response of mixtures with no CNF, the response of the 0.1% CNF mixture mimic that of the loading very well. At the peak values a gradual change in resistivity occurs instead of plateau effect as observed in mixtures with no CNF. The CNF created a conductive path and a network of fibers which when stretched caused a gradual change in resistivity values. The percent difference between the maximum and minimum values was little above 1%, which corresponded to the strain level of about 0.02% for loading frequencies of 5, 1 and 0.5 Hz.

Figure 10:
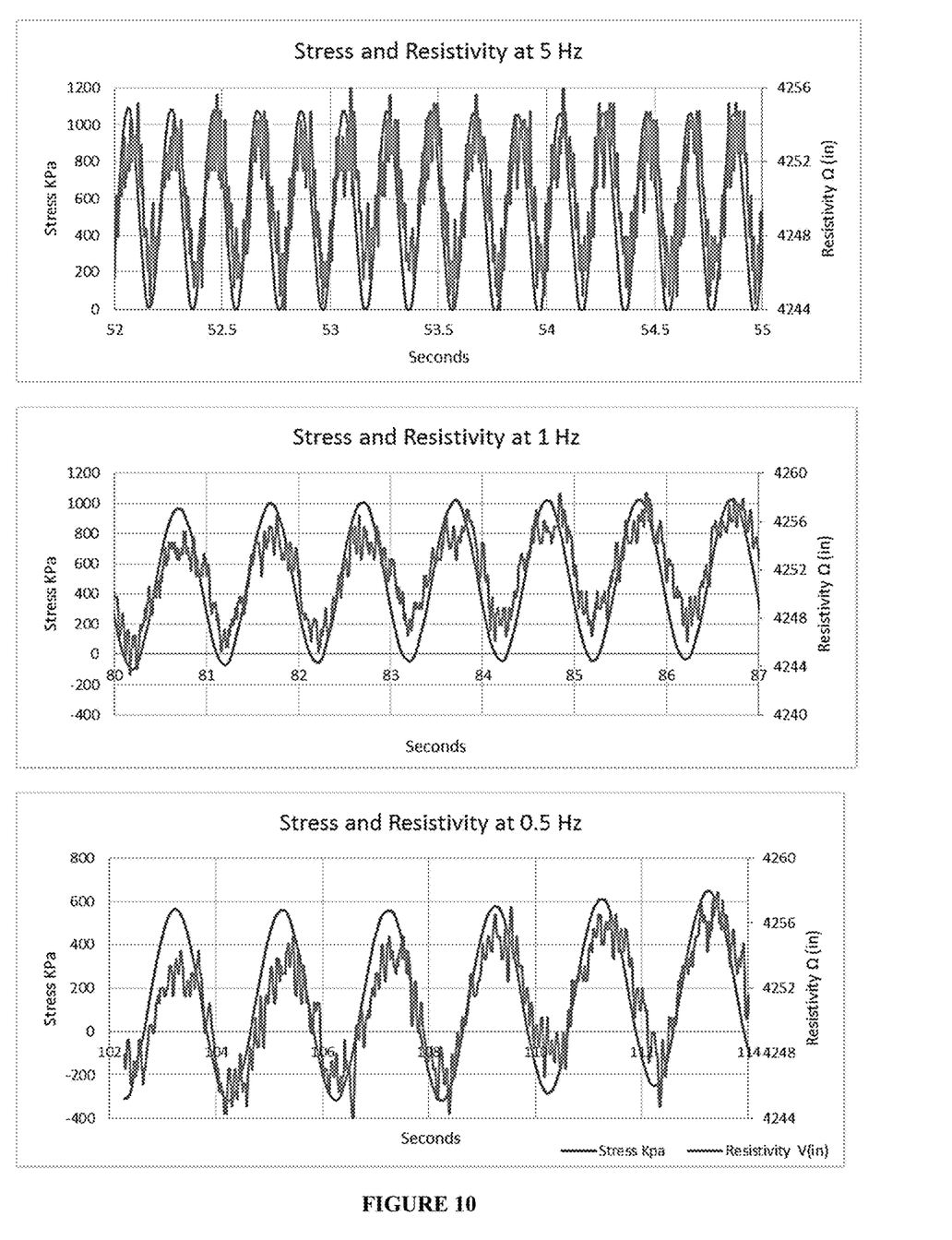
FIG. 10 is a series of graphs that shows tensile stress and resistivity of HPFR-GPC at 0.5% CNF.

The examination of the piezoresistive response of mixture at CNF contents of 0.5% revealed that it does follow the general trend of both the stress and strain values (FIG. 10). This indicates that the material can respond to loading. However, due to the drastic decrease in resistance, the percent changes in resistivity are extremely small. For samples with a CNF content of 0.50% it was determined that average percent differences in resistivity for frequencies of 5 Hz, 1 Hz, and 0.5 Hz, were about 0.25%. This may due to the fact that materials has become very conductive and does not sufficient change in resistivity values.

Figure 11:
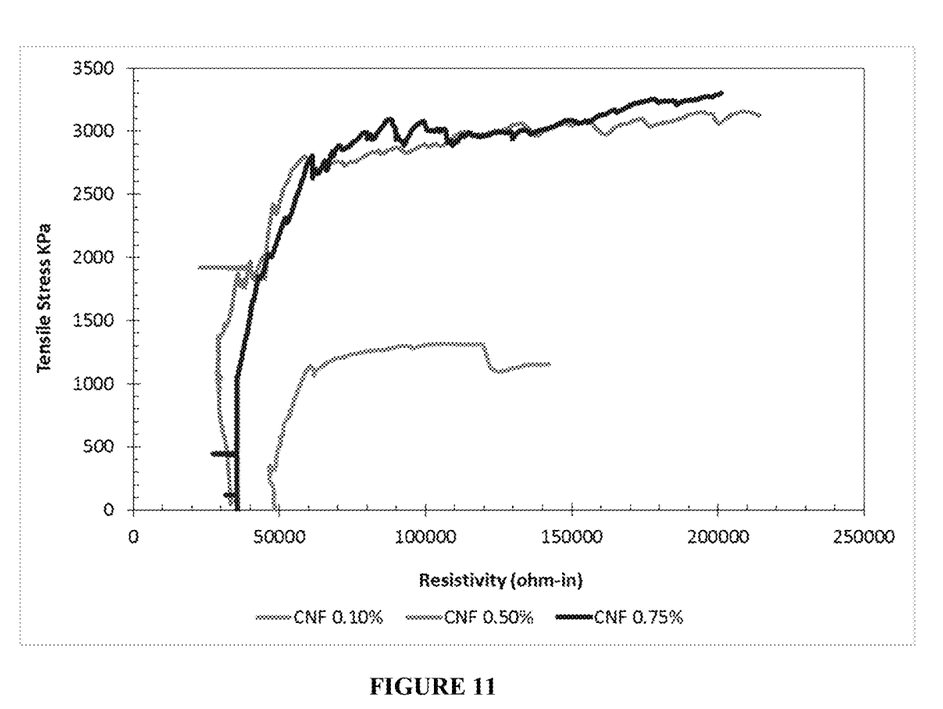
FIG. 11 is a graph that depicts tensile stress and resistivity of CNF HPFR-GPC mixtures.

FIG. 11 clearly exhibits the relation of stress with the resistivity of CNF mixtures under tensile ramp loading. It can be seen that the resistivity increases abruptly with the increase in the stress until the first crack and then the rate of increase significantly decreases, afterwards. This is mainly due to very low level of strain until the first crack. Once the first crack occur the material starts to take large strains and hence more obvious relation with the resistivity could be observed. In general, the mixture was able to simulate the tensile ramp loading response.

For the purpose of understanding the Self-sensing High Performance Fiber Reinforced Geopolymer Composites, references are made in the text to exemplary embodiments of a Self-sensing High Performance Fiber Reinforced Geopolymer Composites, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Self-sensing High Performance Fiber Reinforced Geopolymer Composites may be practiced without one or more of the specific features or advantages of a particular embodiment. In other instances, additional features and advantages may be recognized in certain embodiments that may not be present in all embodiments.

The invention claimed is:

1. A high performance geopolymer composite comprising:
   a. a geopolymer binder;
   b. polyvinyl alcohol fibers, wherein said polyvinyl alcohol fibers content is between 0.5 and 3%;
   c. a chemical activator solution comprising sodium silicate and sodium hydroxide;
   d. an additive comprising fly ash, wherein said fly ash to said chemical activator solution weight ratio is 0.5;
   e. a superplasticizer, wherein said superplasticizer content is between 1 and 2 percent; and
   f. carbon nanofibers, wherein said carbon nanofibers content is between 0.25 and 0.8 percent, and wherein the geopolymer composite has a percent difference in a maximum resistivity value and a minimum resistivity value under tensile load for frequencies of 5 Hz, 1 Hz, and 0.5 Hz, of about 0.25%.

2. The high performance geopolymer composite of claim 1 wherein the geopolymer composite has an average percent difference in resistivity under tensile loading for frequencies of 5 Hz, 1, Hz, and 0.5 Hz, of about 0.25%.

3. The high performance geopolymer composite of claim 1 further comprising rice husk ash.

4. The high performance geopolymer composite of claim 1 wherein said geopolymer binder comprises aluminosilicate rich industrial by-products.

5. The high performance geopolymer composite of claim 1 wherein the fly ash is a Class F Fly Ash from silica sand.

* * * * *